UNITED STATES PATENT OFFICE.

RUDOLF LANGHANS, OF BERLIN, GERMANY.

PROCESS OF MANUFACTURING INCANDESCENT BODIES.

SPECIFICATION forming part of Letters Patent No. 660,114, dated October 23, 1900.

Application filed February 13, 1900. Serial No. 5,052. (No specimens.)

*To all whom it may concern:*

Be it known that I, RUDOLF LANGHANS, a subject of the Emperor of Austria-Hungary, and a resident at No. 6 Under-Stadtbahn, Berlin, Prussia, German Empire, have invented a certain new and useful Improved Process of Manufacturing Incandescent Bodies; and I do hereby declare that the following is a full, clear, and exact description of the invention, which will enable others skilled in the art to which it appertains to make and use the same.

The present invention relates to the manufacture of incandescent bodies by impregnating a combustible fibrous structure or skeleton with a solution of suitable salts, drying the impregnated skeleton, burning the fiber, and exposing the mineral structure thus obtained to the action of an intensely-hot flame; and it has for its purpose to so improve this manufacture that it results in an incandescent body or structure in which a high degree of light-emitting power and permanency of shape in the hot state will be found combined with a by far higher degree of elasticity and resistance to shocks and jars in the cold state than met with in the best descriptions of incandescent bodies in the market.

According to this invention this improvement is obtained by so carrying out the process of producing the incandescent structure that definite proportions of thoria and ceria are caused by the agency of an alkaline oxid to chemically combine as basic components with definite proportions of silica and zirconia as acid components, whereby a compound is formed having, chemically spoken, the nature of a glass, being a silico-zirconiate of thorium and an alkaline metal containing some ceria and which on exposure to the Bunsen flame radiates a brilliant intense light.

The invention, moreover, comprises means whereby the radiance or light-emitting power of said glass can be still-further increased and its light given a very agreeable sun-like shade, as also means whereby the glass has imparted to it a greater resistance to the action of low temperatures.

In order to obtain the best results, the fluid for impregnating the fibrous structure should contain the elements zirconium and silicon of the acid components zirconia and silica in a quantity as close as possible to one molecular weight of each. The quantity of thorium present—*i. e.*, the element of the basic component thoria—may be from at least eight molecular weights up to twenty molecular weights, whereas the quantity of cerium must be such that the proportion of ceria present in the mixture of oxids left behind on burning the fiber is as close as possible to one per cent. of the proportion of thoria then present. As regards the alkaline oxid, which may consist in sodium oxid, potassium oxid, or lithium oxid, it is to be noticed that a small proportion suffices for causing the glass to be formed, but that a great portion is volatilized in the calcining step.

In preparing the fluid I prefer to proceed as follows: So-called "crystallizable sodium silicate" is dissolved in so much water that after all of the other compounds have been added a liquor results which contains thirty per cent. of salts in total and seventy per cent. of water. To this solution is added as much nitric acid as is necessary for decomposing the sodium silicate, the silicic acid liberated thereby entering in solution, as also the sodium nitrate formed. Then such salts of thorium, zirconium, and cerium as are reducible to oxids by the action of heat are added in the quantities necessary for causing their metallic elements to be present in the proportions stated. I prefer to use the nitrates of said earth metals, especially the so-called "basic nitrates of thorium and zirconium," as they are richer in oxids than the metal compounds and, moreover, do no harm to the fiber. The nitrates used should be as free from iron as possible. Instead of sodium silicate silicates of the other alkaline metals—potassium and lithium—may be used, if desired. Obviously the fluid may also be prepared by adding nitrates of thorium, cerium, zirconium, and an alkaline metal to a watery solution of silicic acid. I, however, prefer the first way described.

For making the incandescent structure or body—for instance, a mantle—the usual fabric, having, for reasons hereinafter stated, twice the length and width of the incandescent mantle to be produced and meshes of double the width as compared with those of the fabric generally used, is impregnated with the fluid, composed as described. The impregnated fabric is placed on a mold and dried, when it is removed from the mold and the fiber burned, all as well known to those skilled in the art. Finally the mineral structure obtained is exposed to the action of a blue gas-flame fed with gas under pressure. Under the action of this flame a shrinking of the structure takes place, amounting to fifty per cent. of the volume of the dried fabric. The calcining process is continued until the flame ceases to show the yellowish color imparted to it by the vapors of the volatilized sodium and results in a very regularly shaped mantle that does not any more shrink when used on the Bunsen burner for lighting and has proved to possess a considerable degree of elasticity in the cold state, combined with a degree of strength not hitherto found in the best descriptions of incandescent mantles. Moreover, the mantle looks like a vitrified mass, by which appearance it is readily to be distinguished from any known incandescent body. The result obtained is due to the fact that the constituents of the mantle are not in the state of a mere mechanical intermixture or aggregation, but are bound together chemically into a glass-like compound. This may be explained as follows: When the impregnated and dried fabric is burned, the resulting mineral structure is composed of a molecular aggregation of thoria, (thorium dioxid $ThO_2$,) ceria, (cerium dioxid $CeO_2$,) alkaline metal oxid, oxid of sodium, potassium or lithium, zirconia, (zirconium dioxid $ZrO_2$,) and silica (silicon dioxid $SiO_2$.) If now the heat of a blue flame fed with gas under pressure is applied, part of the alkaline oxid is volatilized, while another part combines with the silica and zirconia, forming a zirconia-silica glass containing a small percentage of the alkaline-metal oxid used. With this glass the thoria and ceria combine in a second phase, the ceria acting, moreover, somewhat as a flux. The compound thus obtained may be called a ceriated silico-zirconiate of thorium and the alkaline metal used.

To serve as a guidance to those skilled in the art, I proceed to give an example for composing the fluid for a mantle containing twenty molecular weights of thorium: 6.804 gram of basic thorium nitrate containing 48.5 per cent. of $ThO_2$; 0.072 gram of basic zirconium nitrate containing 44.27 per cent. of $ZrO_2$; 0.153 gram of crystallizable sodium silicate containing forty-eight per cent. of water, and 0.087 gram of cerium nitrate containing thirty-eight per cent. of $CeO_2$.

The molecular proportions of the several compounds as above stated are those which I prefer, because they give the best result. In cases, however, where perfect regularity of shape is not of importance the proportions of silicon and zirconium may slightly be increased or diminished, and for this reason I wish it to be understood that the term "one molecular weight" is intended to include such slight variations. Too great a variation imparts to the structure a tendency to soften, so that irregularity of shape results. As to the proportion of ceria, the more the same is increased or diminished the more the mantle will soften under the action of the flame and the more its light-emitting power will be diminished. The proportion of thorium should not be superior to twenty molecular weights and not inferior to eight molecular weights, because a higher proportion diminishes the strength, while a lower proportion does not allow regularity of shape to be obtained, and, moreover, diminishes the lighting power.

The incandescent bodies produced by means of my improved process radiate a brilliant white light, their lighting power is at least equal to that of the Welsbach incandescent mantle, and, moreover, the maximum lighting power is retained for a longer period.

I have found that the lighting power or radiance of my improved incandescent body, as well as the period of its maximum light-emission, can be considerably increased and its light given a higher resemblance with the sunlight when cobalt in the form of its protoxid (CoO) is allowed to enter into the chemical composition of the body. In order to obtain the best results, the proportion of cobalt present in the body should correspond as close as possible to one molecular weight of protoxid of cobalt, (CoO.) Even a slightly higher or lower proportion will have the effect that a rather disagreeable color is imparted to the light and the period of maximum light-intensity considerably diminished. I prefer to use the neutral cobalto-nitrate, which is the neutral nitrate of cobalt protoxid, $Co(O_3)_2+6H_2O$, adding the same on preparing the fluid, together with the other nitrates, after decomposition of the sodium silicate by means of nitric acid. If desired, the double nitrate of cerium and cobalt, $2Ce(NO_3)_3+3Co(NO_3)_2+24H_2O$, may be used. In the cold this cobaltic incandescent body can readily be distinguished by its slightly-bluish shade.

In the example given above if it is desired to use cobalto-nitrate 0.0285 gram of same should be used.

Incandescent mantles produced in either way described manifest a tendency to become brittle under the action of low temperatures, so that very cold winter days might be fatal for them. I have discovered that this defectuosity can be perfectly removed by adding on preparing the fluid and together with the said nitrates a salt reducible to oxid under the action of heat of an alkaline-earth metal of the series R O, such as beryllium, calcium, barium, and strontium, or of thallium. In any case I prefer to use a beryllium compound, such as beryllium nitrate, beryllium chlorid, or basic carbonate of beryllium. The proportion present of the alkaline-earth metals used should not be higher than two molecular weights. When the mineral structure obtained by burning the impregnated fabric is acted upon with the calcining-flame, the glass, as specified in the preceding, is first formed when the oxid of the alkaline-earth metal, in consequence of the property of the alkaline metals in general of possessing a higher resistance to heat than sodium oxid, enters into the composition of the glass by substituting part of the sodium oxid.

The presence of the alkaline-earth metal oxid makes it necessary to apply a higher pressure in feeding the calcining-flame. This may to some extent be avoided by adding to the fluid boric acid or a borate of an alkaline metal, preferably sodium borate, which, as is well known, will become active as flux in the calcining step. The proportion of boron thus introduced in the incandescent body must not, however, be more than two molecular weights, for the reason that the increased fluxing power of higher proportions does not allow sufficiently-refractory mantles or other structures or bodies to be produced.

In the example given above, if beryllium oxid is desired to be combined with the glass I prefer to add 0.116 gram of nitrate of beryllium and 0.039 gram of boric acid.

Besides making the mantle better withstand the cold, the presence of beryllium oxid allows the amount of thoria to be increased up to a proportion corresponding to sixty-four and even up to one hundred and twenty-eight molecular weights of thorium without in the least injuring the elasticity, strength, permanency of shape and light-emitting power, nor forbidding the use of cobaltic oxid, provided the quantity of cerium be simultaneously increased accordingly—that is to say, so that in any case there is as much ceria in the mixture of oxids left behind on burning the fiber as one per cent. of the thoria then present.

To serve as a guide for producing such highly-thoriated incandescent bodies, I give the following example, which relates to a body having sixty-four molecular weights of thorium: 15.24 grams of basic thorium nitrate containing 48.5 per cent. of oxid, 0.11 gram of basic zirconium nitrate containing 48.46 per cent. of oxid, 0.107 gram of crystallizable sodium silicate containing forty-eight per cent. of water, 0.196 gram of cerium nitrate containing thirty-eight per cent. of oxid, 0.164 gram of beryllium nitrate containing thirteen to fourteen per cent. of oxid, and 0.108 gram of boric acid. To this are added 0.064 gram of cobalto nitrate if a cobaltic body is desired. I prefer the above composition with the addition of cobalto nitrate, as it results in the most perfect incandescent body I am able to produce.

I am aware that attempts have been made to strengthen incandescent mantles by the aid of silicic acid; but never, as far as I know, has this substance been used in combination with zirconia as a second acid component for forming a glass with thoria, and no man has discovered prior to me that the use of said substances in proportions as stated in the preceding specification has the effect of giving the structure formed with them high degree of elasticity and strength in the cold state and permanency of shape in the hot state without injuring, but increasing the lighting power, as well as the constancy of such increased lighting power. I therefore do not broadly claim the use of silicic acid and zirconia together with thoria; but

What I claim as my invention is—

1. The process of manufacturing incandescent bodies which consists in impregnating a combustible fibrous structure with a fluid containing silicic acid and compounds reducible by heat to oxids of thorium, cerium, zirconium and an alkaline metal in such proportion that there are eight molecular weights at least of thorium, one molecular weight of silicon, one molecular weight of zirconium and so much cerium that the proportion of ceria present in the mixture of oxids left behind on burning the fiber is close to one per cent. of the proportion of thoria then present, drying the impregnated fabric, burning the fiber, and exposing the mineral structure obtained to the action of a flame fed with gas under pressure, substantially as described.

2. The process of manufacturing incandescent bodies which consists in impregnating a combustible fibrous structure with a fluid containing silicic acid and compounds reducible by heat to oxids of thorium, cerium, zirconium, an alkaline metal and cobalt in such proportions that there are eight molecular weights at least of thorium, one molecular weight of silicon, one molecular weight of zirconium, one molecular weight of protoxid of cobalt and so much cerium that the proportion of ceria present in the mixture of oxids left behind on burning the fiber is close to one per cent. of the proportion of thoria then present, drying the impregnated fabric, burning the fiber, and exposing the mineral structure obtained to the action of a flame fed with gas under pressure, substantially as described.

3. The process of manufacturing incandescent bodies which consists in impregnating a combustible fibrous structure with a fluid containing silicic acid and compounds reducible by heat to oxids of thorium, cerium, zirconium, an alkaline metal, cobalt and an alkaline-earth metal of the series R O (including thallium) in such proportions that there are eight molecular weights at least of thorium, one molecular weight of silicon, one molecular weight of zirconium, one molecular weight of protoxid of cobalt, from one to two molecular weights of said alkaline earth metal and so much cerium that the proportion of ceria present in the mixture of oxids left behind on burning the fiber is close to one per cent.

of the proportion of thoria then present, drying the impregnated fabric, burning the fiber, and exposing the mineral structure obtained to the action of a flame fed with gas under pressure, substantially as described.

4. The process of manufacturing incandescent bodies which consists in preparing a fluid by adding nitric acid to a watery solution of sodium silicate and then adding nitrates of thorium, cerium, zirconium, cobalt and beryllium as also boric acid in such proportions that there are eight molecular weights at least of thorium, one molecular weight of silicon, one molecular weight of zirconium, one molecular weight of protoxid of cobalt, from one to two molecular weights of beryllium, from one to two molecular weights of boron, and so much cerium that the proportion of ceria present in the mixture of oxids left behind on burning the fiber is close to one per cent. of the proportion of thoria then present, drying the impregnated fabric, burning the fiber, and exposing the mineral structure obtained to the action of a flame fed with gas under pressure, substantially as described.

5. An incandescent structure composed of a thoria-zirconia-silica glass poor in alkaline-metal oxid and combined with ceria, and beryllium oxid, substantially as described.

6. An incandescent structure composed of a cobaltic thoria-zirconia-silica glass poor in alkaline-metal oxid and combined with ceria and beryllium oxid, substantially as described.

In testimony whereof I have hereunto set my hand in presence of two subscribing witnesses.

RUDOLF LANGHANS.

Witnesses:
HENRY HASPER,
WOLDEMAR HAUPT.